United States Patent [19]

Toppen et al.

[11] 4,089,456

[45] May 16, 1978

[54] CONTROLLED-PRESSURE DIFFUSION BONDING AND FIXTURE THEREFOR

[75] Inventors: Harvey R. Toppen, East Hartford; Joseph F. Loersch, Bolton; Daniel F. Paulonis, Moodus; O. Preston Lowrey, Jr., Madison, all of Conn.

[73] Assignee: United Technologies Corporation, Hartford, Conn.

[21] Appl. No.: 810,692

[22] Filed: Jun. 28, 1977

[51] Int. Cl.² .............................................. B23K 19/00
[52] U.S. Cl. .............................. 228/195; 29/156.8 H; 228/44.1 R; 228/212; 228/243
[58] Field of Search .................. 228/44.1 R, 193, 194, 228/195, 127, 243, 212; 269/234; 29/156.8 B, 156.8 H

[56] References Cited

U.S. PATENT DOCUMENTS

| | | | |
|---|---|---|---|
| 2,464,574 | 3/1949 | Hengstler | 269/234 |
| 2,979,808 | 4/1961 | Booth | 29/156.8 H |
| 3,762,032 | 10/1973 | Bowling et al. | 228/127 |
| 4,042,162 | 8/1977 | Meginnis et al. | 228/106 |

*Primary Examiner*—Donald G. Kelly
*Assistant Examiner*—K. J. Ramsey
*Attorney, Agent, or Firm*—Edward J. Timmer

[57] ABSTRACT

An improved diffusion bonding fixture for holding workpiece surfaces in opposed contacting relation and exerting controlled pressure across the surfaces is disclosed. The fixture includes components having different thermal expansion characteristics which hold the workpiece surfaces together and generate pressure on the surfaces upon heating to the bonding temperature. The fixture also includes one or more pressure-controlling shim members disposed between the components of the fixture, the shim members being selectively and controllably deformed by the expanding components to control said bonding pressure at the desired value and to prevent unwanted distortion of the workpiece surfaces and fixture components. The fixture is especially useful in bonding workpiece surfaces of highly complex configurations, such as those associated with gas turbine blades, vanes and the like.

9 Claims, 7 Drawing Figures

CONTROLLED-PRESSURE DIFFUSION BONDING AND FIXTURE THEREFOR

BACKGROUND OF THE INVENTION

1. Field of the Invention

The present invention relates to diffusion bonding and, more particularly, to a fixture and method for holding workpiece surfaces in contact under controlled pressure during bonding.

2. Description of the Prior Art

Diffusion bonding, including TLP® bonding, is a well known technique for joining metal or alloy parts together, examples of various processes being found in U.S. Pat. Nos. 3,530,568; 3,678,570; 3,680,197; 3,713,207 and others. Generally, such bonding processes require elevated temperatures and pressures for attainment of satisfactory bonding. In the past, however, there has been a problem in bringing the workpiece surfaces together under sufficient pressure to effect bonding without, at the same time, distorting the surfaces and/or the fixture holding the workpieces together. Some prior art workers have utilized dead weight loading which, although capable of applying controlled pressure, requires a plurality of bulky weights, large furnaces to accommodate them and massive equipment capable of handling the heavy loads. Other prior art workers, such as represented by U.S. Pat. No. 3,762,032, have utilized fixtures having components of different thermal expansion characteristics to generate bonding pressure. However, these fixtures have been found to be disadvantageous in that bonding pressure is not readily controllable, resulting in frequent workpiece and fixture distortion from excessive pressure. This distortion problem is especially severe and costly when workpiece surfaces of highly complex geometry, such as those associated with gas turbine blades or vanes, are being bonded together. Patents representative of other relevant prior art are U.S. Pat. Nos. 2,424,878 and 2,882,387.

SUMMARY OF THE INVENTION

Accordingly, it is an object of the present invention to provide an improved fixture and method for holding workpiece surfaces in opposed contacting relation and for exerting controlled pressure across the surfaces during diffusion bonding. An important advantage of the present invention is that bonding can be conducted at a predetermined optimum pressure. Another important advantage of the present invention is that unwanted distortion of the workpiece surfaces and fixture is prevented and results in longer fixture life and greatly reduced part rejections.

The present invention utilizes a fixture wherein components having different thermal expansion characteristics are employed to hold the workpiece surfaces together and to generate the pressure needed for bonding upon heating to the bonding temperature. An important feature of the invention is one or more pressure-controlling shim members disposed between the components of the fixture which shim members are selectively and controllably deformed during heating by the differentially expanding components. According to the present invention, such selective and controlled deformation effectively controls the bonding pressure generated in the fixture at the desired level to insure that an optimum bond is formed across the workpiece surfaces without concomitant distortion of the surfaces or fixture components. A wide range of bonding pressures can be readily provided by varying the material, configuration and dimensions of the shim member in relation to the fixture components.

As a result of the controlled application of bonding pressure, the present invention is especially advantageous in bonding workpiece surfaces of highly complex configuration where distortion is a more frequent problem, such as those surfaces associated with gas turbine blades, vanes and the like.

The foregoing and other objects, features and advantages of the present invention will become more apparent in the light of the following detailed description of preferred embodiments thereof as discussed and illustrated in the accompanying drawings.

DESCRIPTION OF PREFERRED EMBODIMENTS

Although the exemplary embodiment set forth in detail hereinbelow relates to an improved fixture for TLP® bonding turbine blade halves together, it is offered merely for illustration and is not intended to limit the scope of the present invention. Other fixture configurations and diffusion bonding techniques, including brazing, are also considered within the scope of the present invention.

Figure 1:
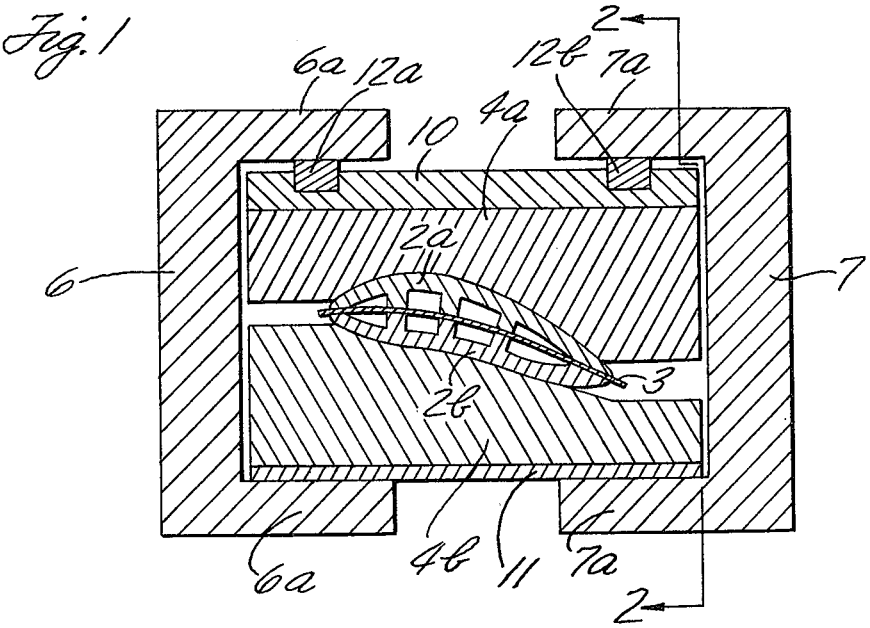
FIG. 1 is a vertical sectional view through a fixture contemplated by the present invention.
Figure 2:
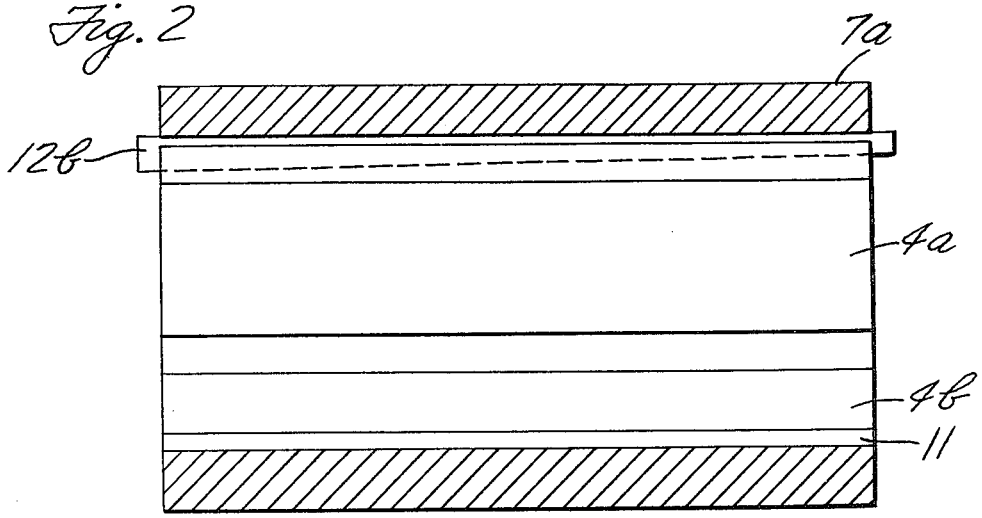
FIG. 2 is a sectional view taken along line 2—2 of FIG. 1.

FIG. 1 illustrates a fixture for holding turbine blade halves 2a and 2b and interlayer alloy bonding foil 3 together and for exerting controlled pressure across the surfaces and foil, the pressure being substantially normal thereto. For the sake of illustration, the fixture will be described as one designed for bonding nickel base superalloy turbine blade halves together, such as taught in U.S. Pat. Nos. 3,965,963 and 3,981,344. In such a situation, the fixture includes stainless steel (AISI Type 330) die members 4a and 4b having interior surfaces in opposed working relation defining a cavity in the general shape of the turbine blade to be produced. As is apparent from FIG. 1, the cavity defined by the interior surfaces intimately receives the blade halves and maintains the blade half surfaces to be bonded in precise contacting relation. Positioned along the opposite longitudinal sides of the die members are TZM molybdenum "C" clamps 6 and 7 which have opposed flanges 6a and 7a overlapping the top and bottom surfaces of the die members. Above die member 4a and below die member 4b are nondeformable TZM molybdenum plates 10 and 11 which function to distribute forces evenly over the die members to prevent localized deformation thereof. Plate 10 includes tapered channels machined in the top surface opposite the upper flanges of the "C" clamps for receiving similarly tapered, pressure-controlling shim members 12a and 12b. As shown most clearly in FIG. 2, the shim members are slightly tapered and extend through the tapered channels the entire length of the die members. When assembled as shown in the figures and heated to the appropriate bonding temperature, for example 2000°–2350° F for most nickel base superalloy blade halves, the stainless steel dies (coefficient of thermal expansion of $9 \times 10^{-6}$ in./in./° F at room temperature) expand more than the TZM molybdenum "C" clamps (coefficient of thermal expansion of $2.3 \times 10^{-6}$ in./in./° F at room temperature), thereby generating pressure on the mated blade half surfaces and bonding foil therebetween.

Figure 3:
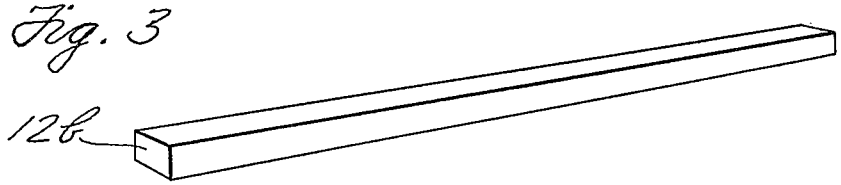
FIG. 3 is a perspective view of a shim member.

According to the invention, shim members 12a and 12b are made of a preselected material and have a preselected load-bearing, cross-sectional geometry substantially normal to the direction of pressure such that the shim members are selectively and controllably deformed by the pressure generated by the expanding die members and "C" clamps during heating, the deformation not only preventing unwanted distortion of the blade half surfaces and fixture components but also allowing bonding to be conducted at a predetermined optimum pressure, as explained hereinbelow. In the embodiment illustrated, shim members made of the same stainless steel (AISI Type 330) as the die members have been found suitable in manufacturing internally cooled nickel base superalloy turbine blades for commercial gas turbine engines. The shape, including dimensions and taper, of the shim members, FIG. 3, were determined empirically from bonding experiments to provide optimum bonding with no distortion of the blade halves or fixture components. Of course, the material, configuration, dimensions and taper of the shim members and the number used will vary depending upon the geometry and alloy composition of the particular parts being bonded, the fixture configuration utilized and the bonding pressure desired. By varying these features of the shim members in prescribed relation to the die members and "C" clamps, a wide range of bonding pressures can be readily provided to suit particular needs. For example, bonding pressures from as little as a few pounds per square inch to as high as several thousand pounds per square inch can be generated by proper selection of the shim member features in relation to those of the die members and "C" clamps. Those skilled in the art will recognize that these features can be readily determined in each case by bonding experiments and/or mathematical analyses.

Although it is not essential to the present invention that the shim members and channels in plate 10 be tapered, it is preferable since the tapered design facilitates assembly of the fixture and, if desired, may be used to preload the blade half surfaces. For example, preloading may be easily effected by applying pressure to die members 4a and 4b to force them together to the desired extent and then by inserting the tapered shim member snuggly into the machined channels in plate 10, a shim taper of 6° or less having been found to provide suitable locking action to maintain the preload. Hydraulic or pneumatic rams have been found to be suitable for applying the preloading pressure to the dies and inserting the shim members in the channels to provide consistent preloading. Of course, it will be appreciated by those skilled in the art that shim members may also be incorporated into channels provided in plate 11 either in lieu of or in addition to those in plate 10.

Figure 4:
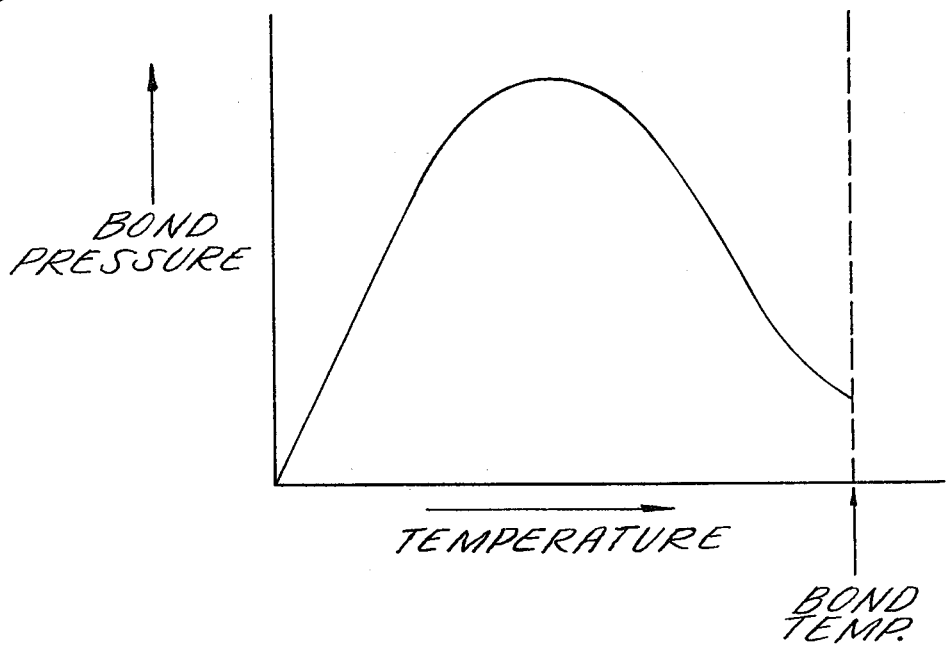
FIG. 4 is a graph representing the typical variation of bond pressure with temperature in the improved fixture.
Figure 5:
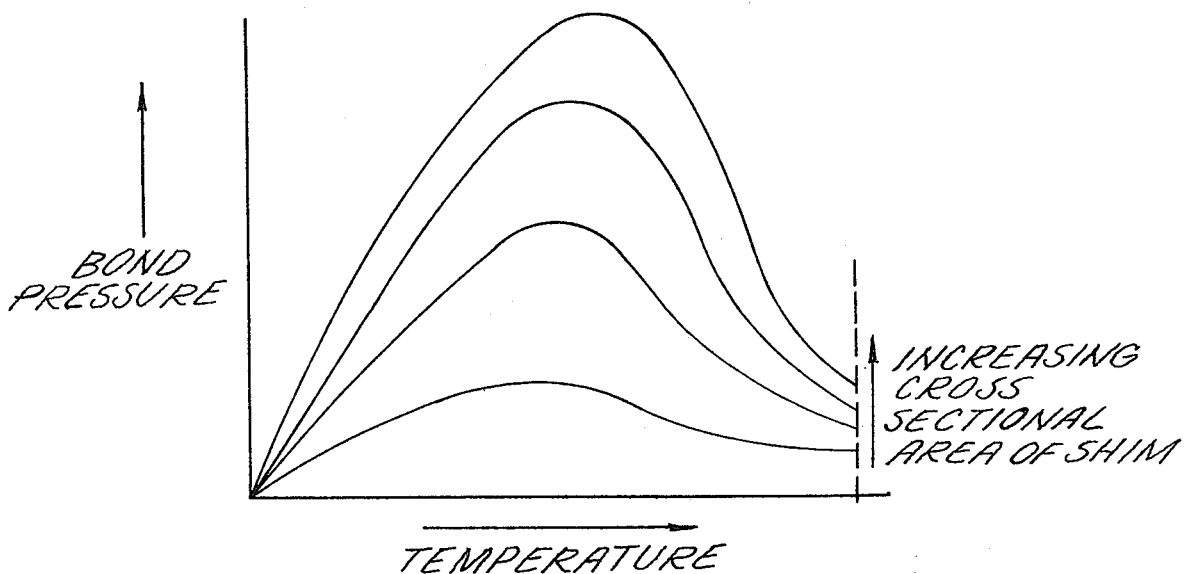
FIG. 5 is a graph showing how the curve of FIG. 4 can be displaced by increasing the cross-sectional area of the shim member.
Figure 6:
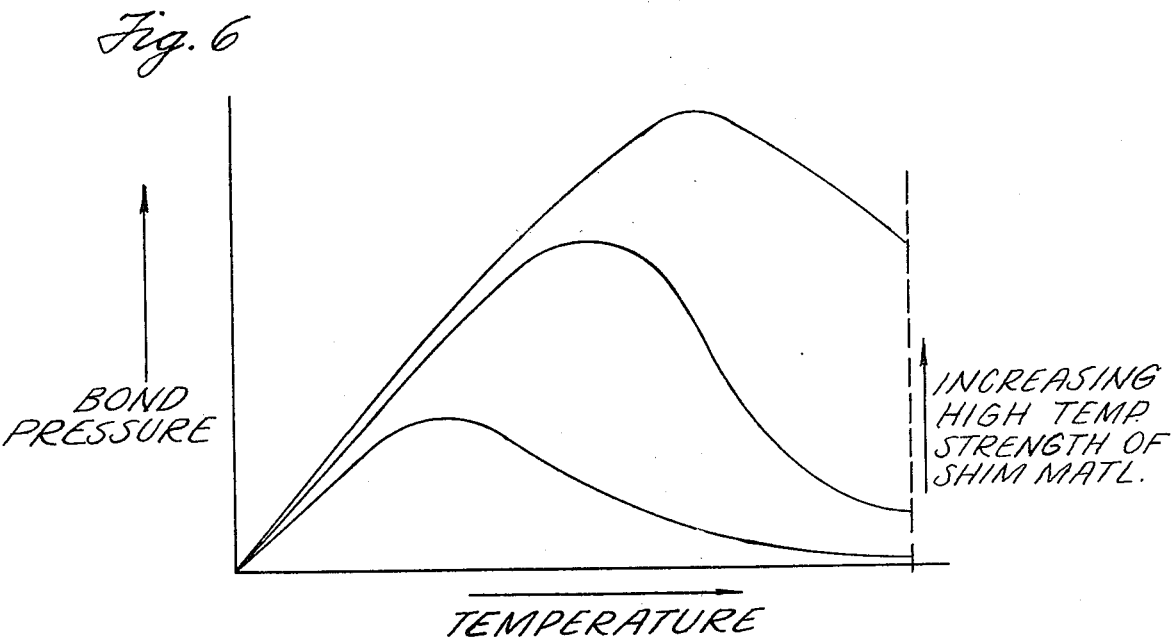
FIG. 6 is a graph showing how the curve of FIG. 4 can be altered by increasing the high temperature yield strength of the shim material.
Figure 7:
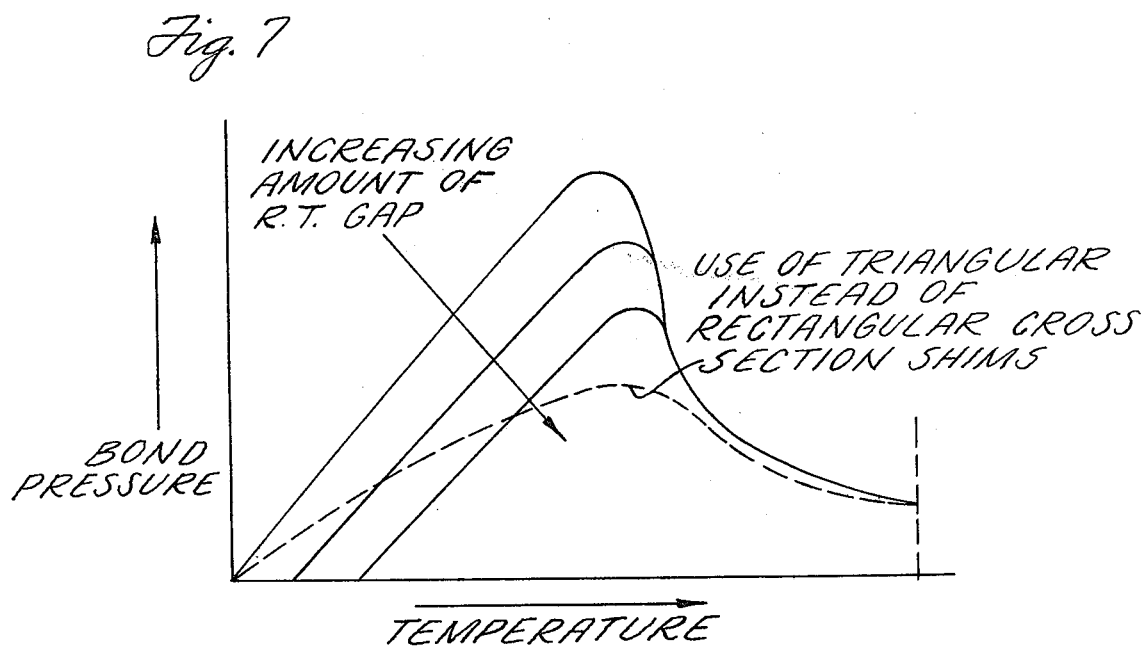
FIG. 7 is a graph showing how the curve of FIG. 4 can be displaced by providing a gap in the fixture and by varying the shape of the shim member.

When the fixture of FIG. 1 is placed in a bonding furnace and heated to the appropriate bonding temperature, the differential expansion of the stainless steel die members relative to the molybdenum "C" clamps generates bonding pressure. As the temperature rises during such heat-up, the bonding pressure continually increases until the yield strength of the shim members is exceeded. At this point in the bond cycle, the bonding pressure equals the yield stress of the shim members times their cross-sectional area. Bonding pressure in the parts being joined can then be calculated from this load. Further increases in temperature are accompanied by opposing effects; namely, increased plastic deformation of the shim members tends to raise the bond pressure as a result of work hardening of the shim member material while increased temperature tends to lower the bond pressure as a result of a decrease in the yield strength of the members. At lower temperatures of heat-up, the first effect (work hardening) predominates and results in an increase in bonding pressure. However, at higher temperatures, e.g., around 500° F for the above example, the second effect (reduced yield strength) becomes more controlling and causes a decrease in the bond pressure with further temperature increases. This typical variation of bond pressure with temperature is shown in FIG. 4. By varying the material, configuration, and dimensions of the shim members, this basic curve can be altered to provide the bonding pressure desired in a particular application. For example, increasing the cross-sectional area of the shim members normal to the direction of pressure displaces the curve upwardly as shown in FIG. 5. Increasing the high temperature yield strength of the shim material alters the basic curve as shown in FIG. 6, providing higher pressures at higher temperatures for longer times. Also, the generation of bonding pressure during heatup can be delayed, FIG. 7, as desired by leaving a room temperature gap or space between the shim members and flanges of the "C" clamps. Finally, by utilizing shim members having a varying cross-sectional area normal to the direction of pressure, such as triangular, trapezoidal and like members, the high rate of initial bond pressure increase and subsequent bond pressure decrease associated with the basic curve may be reduced to provide a more uniform controlled pressure throughout bonding, such as illustrated by the dotted line in FIG. 7. From FIGS. 4–7, it will be apparent to those skilled in the art that the present invention provided great flexibility in tailoring bonding pressure to particular bonding requirements while at the same time preventing workpiece and fixture distortion. The number of turbine blades rejected for improper bonds and/or excessive tolerance variations is thus significantly reduced with the aid of the present invention.

With respect to the preferred embodiment discussed hereinabove, namely, the TLP bonding of nickel base superalloy turbine blade halves, the characteristics of the basic curve are selected such that the maximum or peak pressure occurs before the final bonding temperature is reached, the pressure being sufficient to set the mating surfaces in intimate contacting relation but insufficient to exceed the yield strengths of the die members, clamps and blade halves. The preliminary pressure peak insures that the mating surfaces are properly contacted prior to bonding. Thereafter, the pressure is allowed to decrease upon further heating until, at the bonding temperature, for example, 2000° F, the bonding pressure is at the desired value, such as 10 psi, for sound bond formation. Of course, for conventional diffusion bonding, that is, bonding without the interlayer foil, the shim member features are selected in relation to the fixture components to provide a high bonding pressure for a preselected time after the bonding temperature is reached.

It should be noted that under some circumstances it may be desirable and preferred to use a plurality of bonding fixtures to apply pressure to different areas or sections of the workpieces. For example, in bonding turbine blade halves together, it may be desirable to use one fixture, such as shown in FIG. 1, to apply controlled pressure to the airfoil surfaces of the blade halves and another fixture of somewhat different configuration to apply controlled pressure to the root sections of the blade halves. By utilizing different fixtures on different sections of the blade halves, it will be possible to apply bonding pressure specifically tailored to each section and will result in an overall improvement in bonding uniformity throughout the blade.

Although this invention has been shown and described with respect to a preferred embodiment thereof, it should be understood by those skilled in the art that various changes and omissions in the form and detail thereof may be made therein without departing from the spirit and the scope of the invention.

Having thus described a typical embodiment of our invention, that which we claim as new and desire to secure by Letters Patent of the United States is:

1. In a fixture for holding workpiece surfaces in opposed contacting relation and exerting pressure on said surfaces for diffusion bonding, wherein the pressure is generated by components of the fixture expanding differentially upon heating to the bonding temperature, the improvement comprising pressure-controlling means disposed between the components of the fixture for insuring sound bonding across the workpiece surfaces without distortion of said surfaces or fixture components, said means including:
   at least one shim member made of a preselected material and having a preselected load-bearing, cross-sectional geometry substantially normal to the direction of pressure such that the shim member is selectively and controllably deformed during heating by the differentially expanding components to control the bonding pressure at the desired value and prevent unwanted distortion of the workpiece surfaces and fixture components.

2. A fixture for use in diffusion bonding workpiece surfaces together, comprising:
   a. first and second die members having interior surfaces in opposed working relation to define a cavity therebetween for intimatley receiving the workpieces and holding the workpiece surfaces to be bonded in opposed contacting relation such that pressure generated in the fixture will be substantially normal thereto and exterior surfaces on sides opposite said interior surfaces;
   b. a clamping member at least partially surrounding the exterior surfaces of the die members to hold said members and interior surfaces thereof in working relation, said clamping member having a coefficient of thermal expansion less than that of the die members so that pressure is generated substantially normal to the workpiece surfaces when the fixture is heated; and
   c. pressure-controlling means disposed between the exterior surface of one of said die members and the clamping member, said means including at least one shim member made of a preselected material and having a preselected load-bearing, cross-sectional geometry substantially normal to the direction of pressure such that the shim member is selectively and controllably deformed during heating by said expanding die members to control the bonding pressure at the desired value and prevent unwanted distortion of the workpiece surfaces and fixture components.

3. The fixture of claim 2 wherein the cavity between the die members defines the general shape of a gas turbine blade, vane and the like.

4. The fixture of claim 2 wherein the clamping member includes opposed "C" clamps positioned on opposite sides of the die members, each clamp having first and second flanges partially operlapping the exterior surfaces of the die members.

5. The fixture of claim 4 wherein pressure-controlling members are disposed between the exterior surface of one of said die members and the flanges of said "C" clamps overlapping said surface.

6. The fixture of claim 4 wherein a deformation-resistant plate is disposed between the exterior surface of one of said die members and the flanges of the "C" clamps overlapping said surface, the surface of the plate facing the flanges having a tapered channel therein opposite each flange and extending the length of the fixture, and tapered shim members are cooperatively positioned within said channels.

7. The fixture of claim 6 for bonding nickel base superalloy turbine blades, vanes and the like wherein the die members and shim members are stainless steel and the clamps and plate are TZM molybdenum.

8. In a method for diffusion bonding workpiece surfaces together, wherein the workpiece surfaces are held in opposed contacting relation in a fixture and bonding pressure is exerted by components of the fixture expanding differentially upon heating to the bonding temperature, the steps of:
   a. positioning pressure-controlling means between the components of the fixture, said means including at least one shim member made of a preselected material and having a preselected load-bearing, cross-sectional geometry substantially normal to the direction of pressure such that the shim member will be selectively and controllably deformed during heating by said expanding components to control the bonding pressure at the desired value and prevent unwanted distortion of the workpiece surfaces and fixture components, and
   b. heating the fixture to the bonding temperature, said components differentially expanding and generating pressure across the workpiece surfaces, said pressure being controlled by the selective and controlled deformation of the shim members at the desired value for sound bond formation and for prevention of unwanted distortion of the workpiece surfaces and fixture components.

9. In a method for bonding workpiece surfaces together utilizing a transient liquid phase wherein the workpiece surfaces having an interlayer alloy therebetween are held in opposed contacting relation in a fixture and pressure is exerted by components of the fixture expanding differentially upon heating to the bonding temperature, the steps of:
   a. positioning pressure-controlling means between the components of the fixture, said means including at least one shim member made of a preselected material and having a preselected load-bearing, cross-sectional geometry substantially normal to the direction of pressure such that the shim member will be selectively and controllably deformed during heating by said expanding components to provide a maximum pressure before the bonding temperature is reached, said maximum pressure being sufficient to effect proper contact between the mating surfaces and interlayer alloy but insufficient to plastically deform the components of the fixture and workpiece surfaces, and then during subsequent heating to the bonding temperature to provide a decreased pressure, said reduced pressure being sufficient to insure that a sound bond is formed between the workpiece surfaces; and b. heating the fixture, said components differentially expanding and generating pressure across the workpiece surfaces, the pressure reaching said maximum before the bonding temperature is reached and thereafter decreasing to said reduced pressure at the bonding temperature as a result of the selective and controlled deformation of the shim member, sound bonding without unwanted distortion of the workpiece surfaces and fixture components being thereby effected.

* * * * *